United States Patent [19]

Smith

[11] 3,967,830

[45] July 6, 1976

[54] ADJUSTABLE TENSION AND/OR COMPRESSION TAP HOLDER

[75] Inventor: Theodore M. Smith, Mount Clemens, Mich.

[73] Assignees: The Theodore M. Smith Trust, Mount Clemens, Mich., Lucille G. Smith; Theodore M. Smith, trustees

[22] Filed: Nov. 3, 1975

[21] Appl. No.: 628,387

[52] U.S. Cl. .............................. 279/16; 10/135 R; 279/76; 408/239 A
[51] Int. Cl.² ..................... B23B 31/08; B23G 1/46; B23G 3/06
[58] Field of Search ........... 408/238, 239, 240, 714; 279/75, 76, 16; 10/135 R

[56] References Cited
UNITED STATES PATENTS

| | | | |
|---|---|---|---|
| 3,091,473 | 5/1963 | Bilz | 279/76 |
| 3,652,099 | 3/1972 | Bilz | 279/75 X |
| 3,751,051 | 8/1973 | Schmidt | 408/239 X |

*Primary Examiner*—Othell M. Simpson
*Assistant Examiner*—Horace M. Culver
*Attorney, Agent, or Firm*—Cullen, Settle, Sloman & Cantor

[57] ABSTRACT

An adjustable tension and/or compression tap holder includes a shank adapted for rotative drive and longitudinal feed and mounting a drive socket at one end. A cylindrical carrier slidably nested within said socket and has a series of drive slots which receive a corresponding series of drive balls nested within said socket interconnecting said shank and carrier for rotation in unison and providing for longitudinal adjustment of the carrier relative to the socket. The carrier is adapted to receive a tap retaining bushing. A tension and compression adjusting screw is nested within said shank and at one end, loosely secured upon said carrier. A tension and compression adjusting nut is threaded into said shank and is interconnected with said screw so that rotation of the screw will effect longitudinal adjustment of the adjusting nut. The tension spring is interposed between said nut and said screw biasing the screw inwardly of the socket and an additional compression spring is interposed between said nut and carrier whereby longitudinal adjustment of the nut regulates the degree of tension and compression within the longitudinal scope of the carrier and connected screw relative to said shank and socket.

6 Claims, 3 Drawing Figures

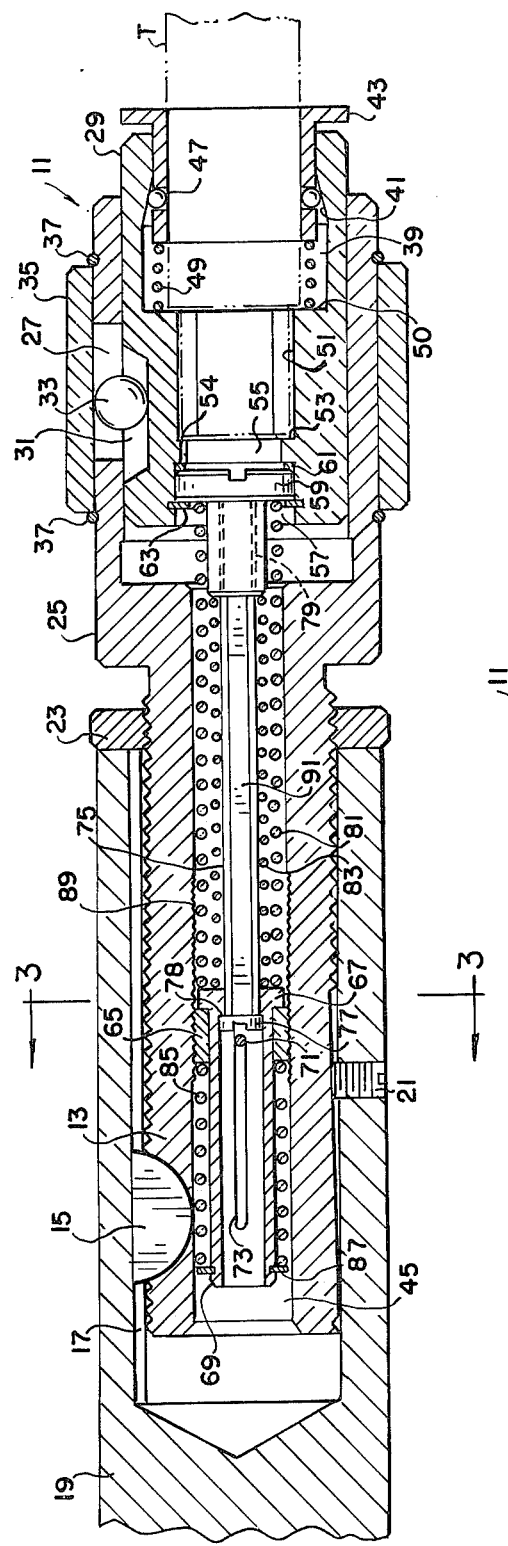
FIG. 1
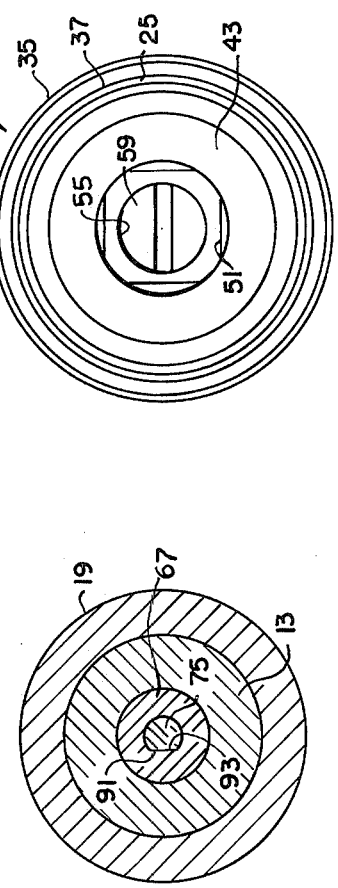
FIG. 2
FIG. 3

ADJUSTABLE TENSION AND/OR COMPRESSION TAP HOLDER

BACKGROUND OF THE INVENTION

In the prior art as shown in U.S. Pat. No. 3,091,473, a length compensating device for quick change chucks is adapted for mounting taps but wherein adjustment as to length was accomplished by the use of variable length spacers which had to be separately introduced and assembled for regulating the longitudinal setting of an adapter carrying member relative to said shank. In that disclosure, a corresponding socket on the shank received a carrier which was adapted to removably receive an adapter to accommodate a tap or other tool. A single compression spring was employed to yieldably resist relative inward or outward movements of the adapter carrier in operation.

SUMMARY OF THE INVENTION

It is the object of the present invention to provide an improved adjustable tension and/or compression tap holder which provides a means for length compensation and adjustment tension merely by the application of a screw driver to either end of the shank and carrier assembly.

It is a further object to provide in an adjustable tension and/or compression tap holder which mounts within the shank a longitudinally adjustable nut for regulating the corresponding tension and compression with respect to a screw which yieldably anchors a carrier receiving a tap holding bushing. The present improved tap holder includes tension as well as compression means assembled in connection with the carrier mounting whereby the degree of tension and/or compression can be easily regulated as well as the projection length of the tap holding bushing carrier with respect to the tap holder shank.

These and other objects will be seen from the following specification and claims in conjunction with the appended drawing.

THE DRAWING

FIG. 1 is a longitudinal section of the present adjustable compression tap holder as mounted within a power rotated spindle, fragmentarily shown.

FIG. 2 is an end view thereof;

FIG. 3 is a section taken in the direction of arrows 3—3 of FIG. 1.

DETAILED DESCRIPTION OF THE INVENTION

Referring to the drawing, the present adjustable compression tap holder 11 includes an elongated shank 13 which mounts a key 15 nesting within a keyway 17 within the bore of tapping spindle 19, fragmentarily shown. Said spindle is adapted for rotative drive and longitudinal feed in a conventional manner. Set screw 21 extends radially into said spindle and retainingly engages shank 13. The conventional nut 23 is threaded upon said shank for limiting inward projection of the shank within said spindle.

Shank 13 terminates at one end in the enlarged drive socket 25 which includes a series of spaced longitudinally extending slots 27 receiving the drive balls 33. Cylindrical shell 35 to retain said balls is removably anchored upon said socket by the locking rings 37 at its opposite ends.

Cylindrically shaped carrier 29 is adjustably nested within said socket and has a corresponding series of longitudinally extending exterior slots 31 adapted to receive the drive balls 33 to, thereby, interconnect the carrier with the socket and spindle for rotative motion therewith and for permitting longitudinal adjustment of said carrier relative to said socket.

Said carrier has a longitudinal bore therethrough and which includes the enlarged counterbore 39 at its outer end which terminates in the annular but tapered surface 41 for supportably receiving and securing the conventional bushing 43. Said bushing in a conventional manner mounts a series of balls 47 which register with the tapered interior surfaces 41 and are adapted to retainingly engage the tap T, fragmentarily shown. Compression spring 49 rests upon the shoulder 50 within said carrier and at its other end bears against said bushing normally biasing the same outwardly so that the balls 47 in a conventional manner retainingly engage the tap T.

The bore through the carrier also includes inwardly of bore 39 and shoulder 50, the bore 51 which is square in cross section and is adapted to drivingly receive the square inner end of the tap which in assembled relation registers against shoulder 53. Said shoulder defines the axial bore 55 which terminates in the counterbore 57 at the other end of said carrier.

The headed carrier retainer screw 59 bears against shoulder 54 with a suitable friction washer 61 interposed, and is loosely anchored with respect to said carrier by the exterior snap ring 63.

The tension and compression adjusting nut 65 is adjustably threaded within the threaded bore 89 forming a portion of bore 45 of spindle 13.

A tension and compression bushing includes elongated shank 69 within said bore terminating at one end in the external flange 67 which bears against one end of the tension and compression adjusting nut 65. A radial pin 71 is internally secured to nut 65 and loosely projects within an elongated slot 73 formed in said bushing whereby rotation of said bushing will effect a corresponding rotation of said nut and corresponding longitudinal adjustments thereof in two directions.

An elongated tension and compression adjusting screw 75 extends within the bore 45 of said spindle and axially through said bushing with its head 77 retainingly engaging an internal flange or shoulder 78 upon said bushing as shown in FIG. 1. The inner end of said screw is threaded as at 79 within the internal threaded bore of the carrier retainer screw 59 and secured thereto.

Since said carrier retainer screw has an enlarged head and a transverse slot, it appears that the tension and compression adjusting screw may be regulated and adjusted from either end thereof, without disassembly of the shank and carrier.

Said screw has a flat side portion 91 which operatively registers with a corresponding flat side wall portion 93 upon the interior of the bushing adjacent shoulder 78 whereby manual adjustment rotation of the screw 75 effects the corresponding rotation of the bushing 67, 69 and a simultaneously adjustment rotation of the nut 65.

A pair of concentric compression springs 81 and 83 loosely surround the adjusting screw and at their one ends, bear against said bushing and at their other ends, bear against the carrier retaining screw 59 for biasing the carrier outwardly with respect to the shank socket 29.

A corresponding adjustable tension spring 85 loosely surrounds the bushing, at one end bears against the adjusting nut 65 with its other end anchored by the snap ring 87 mounted upon an inner end portion of said bushing.

Tension spring 85 is adapted for biasing the adjusting screw and connected carrier 29 inwardly of the shank and socket. The compression springs 81 and 83 tend to bias the carrier outwardly of said housing.

In operation by manipulation of the adjusting screw 75 from either end, there will be effected a corresponding longitudinal adjustment in either direction of the tension and compression adjusting nut 65. Such adjustment will modify the degree of tension and compression and will, at the same time, effect a longitudinal adjustment of the carrier 29 with respect to the shank mounted socket 25.

In the illustrative embodiment, there is a connecting means between the screw 75 and the tension and compression nut 65. Such connecting means includes the flat surfaces 91 and 93 upon said screw and bushing as well as the pin and slot connection 71, 73 between said nut and bushing whereby, rotation of the screw effects corresponding rotation of the nut.

Having described my invention, reference should now be had to the following claims.

I claim:

1. An adjustable compression tap holder comprising an elongated shank having an internally threaded bore and a drive socket at one end communicating with said bore;
    said shank adapted for securing within a longitudinally adjustable power rotated spindle;
    a carrier of cylindrical shape having a bore therethrough slidably nested within said socket and having a series of spaced longitudinal drive slots;
    a corresponding series of drive balls nested and retained in corresponding slots in said socket and operatively extending into said drive slots, for interconnecting said shank and carrier and providing for longitudinal adjustment of said carrier relative to said socket;
    said carrier adapted to receive a quick release tap retaining bushing;
    a tension and compression adjusting screw nested in said shank bore and at one end secured to and journalled upon said carrier;
    a tension and compression adjusting nut threaded into said shank bore;
    connecting means between said screw and nut, whereby manual rotation of said screw effects corresponding rotation and longitudinal adjustment of said nut;
    a tension spring between said nut and said connecting means, biasing said screw and connected carrier inwardly of said socket;
    and a compression spring between said nut and carrier biasing said carrier outwardly of said socket, whereby longitudinal adjustment of said nut regulates said tension and compression and the longitudinal positioning of said carrier and the tap carrier thereby relative to said socket.

2. In the adjustable compression tap holder of claim 1, said carrier having an enlarged counterbore at one end adapted to receive and secure said tap retaining bushing; and an inner bore of square cross section adapted to drivingly receive the square end of a tap retained in said bushing.

3. In the adjustable compression tap holder of claim 1, said screw having an enlarged head and transverse slot upon its opposite ends, whereby a tool axially projected selectively into either end of the shank and carrier assembly can rotatively adjust said screw and the connected tension and compression adjusting nut.

4. In the adjustable compression tap holder of claim 1, the securing of said screw to said carrier including a headed carrier retaining screw nested and retained within the carrier bore and internally threaded to receive the end of said adjusting screw for securing thereto and for rotation in unison, whereby a tool axially projected selectively into either end of said shank and carrier assembly can rotatively adjust said screws and the connected tension and compression adjusting nut.

5. In the adjustable compression tap holder of claim 1, said connecting means including a tension and compression adjusting bushing having at one end an external flange interposed between said nut and compression spring, and an internal flange retainingly engaging said screw, said screw and bushing having corresponding flat engaging surfaces for rotation in unison; and a pin and slot connection between said bushing and nut, so that rotation of said bushing effects corresponding rotation of said nut.

6. In the adjustable compression tap holder of claim 5, the anchoring of said tension spring relative to said connecting means including a snap ring anchored upon said bushing and receiving one end of said tension spring.

* * * * *